United States Patent [19]

Dziuk

[11] 4,160,256

[45] Jul. 3, 1979

[54] TUBULAR PEN FOR RECORDING APPARATUS

[75] Inventor: Peter Dziuk, Nüremberg, Fed. Rep. of Germany

[73] Assignee: J. S. Staedtler, Nuremberg, Fed. Rep. of Germany

[21] Appl. No.: 841,565

[22] Filed: Oct. 12, 1977

[30] Foreign Application Priority Data

Oct. 26, 1976 [DE] Fed. Rep. of Germany ....... 2648319

[51] Int. Cl.[2] ............................................ G01D 15/16

[52] U.S. Cl. ............................................... 346/140 A

[58] Field of Search ........................ 346/140 R, 140 A

[56] References Cited

U.S. PATENT DOCUMENTS

| | | | |
|---|---|---|---|
| 3,094,104 | 6/1963 | Gauley | 346/140 |
| 3,229,669 | 1/1966 | Kuyt | 346/140 |
| 3,706,099 | 12/1972 | Jones et al. | 346/140 |

*Primary Examiner*—George H. Miller, Jr.

*Attorney, Agent, or Firm*—Edmund M. Jaskiewicz

[57] ABSTRACT

A tubular pen for recording apparatus and the like has a freely displaceable weight within a hollow body and there is a cap or protective element on the end of the body. The cap and the weight are connected together by a spring of metal or synthetic resin material such that there is relative movement between the cap and weight and the interconnected cap and weight together with the spring constitute a single assembly. The spring has its ends firmly attached to the cap and weight or may be integral with these two components.

9 Claims, 3 Drawing Figures

TUBULAR PEN FOR RECORDING APPARATUS

The present invention relates to a tubular pen for recording apparatus wherein the pen includes a displaceable weight therein and a protective or retaining element on an end of the pen body, more particularly, to the connection between the weight and the protective element.

Tubular pens have been provided for recording instruments, drafting and other applications generally of a technical nature wherein a tubular writing tip is on one end of the pen body and a cap or protective element on the other end. Within the body is a freely displaceable weight which has a wire attached thereto to extend into the writing tube for cleaning the tube. The cap element prevents the weight from accidentally or unintentionally dropping from the pen and at the same time limits the range of displacement of the weight within the pen.

In particular applications of such a pen especially on automatic drafting machines, various recording instruments or also in manual applications, it has been proposed to arrange a spring between the freely displaceable weight and the end cap or stop. As result of this arrangement the weight and the cleaning wire are always retained in the same position and the weight is displaced against the force of the spring only when the pen is to be used.

The use of such springs was not satisfactory since these springs were loosely inserted into the pen. The springs thus were susceptible of dropping out of the pen and becoming lost when the pen, for any reason, was opened or the end cap removed. Further, the use of such intermediate springs required a more expensive assembly operation during the manufacturing process.

It was then proposed that such loosely inserted springs should be retained in annular grooves in the weight or in the locking element so that these two elements are held in a particular position with respect to each other. One such arrangement is disclosed in DT-AS No. 1,010,868.

However, this groove arrangement was not satisfactory since additional expense was involved for undercutting or forming the annular grooves to receive the springs. Further, this arrangement had the disadvantage in that the spring could easily become detached from these elements and thus become lost, particularly during the assembly of the individual components of the pen. The spring could also become separated and lost during disassembly of the pen by the user for cleaning or maintenance purposes.

It is therefore the principal object of the present invention to provide an improved tubular pen for recording apparatus and the like.

It is another object of the present invention to provide such a tubular pen which eliminates the possibility of loss of the spring during assembly or disassembly operations and which facilitates the handling of certain components of the pen during manufacturing assembly operations.

It is a further object of the present invention to provide such a tubular pen wherein the weight and locking or cap element constitute a single assembly.

According to one aspect of the present invention a tubular pen for recording apparatus and the like may comprise a hollow body having a freely displaceable weight therein. An end cap is attached to the end of the body and means are firmly attached to each of the cap and weight to connect the cap and weight for relative movement with respect to each other and to enable the cap and weight to define a single assembly.

In one embodiment of the invention a spring-type connecting element interconnects the weight and the end cap and the connecting element may formed integral with the weight and cap or may be firmly attached to these elements in a suitable manner.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
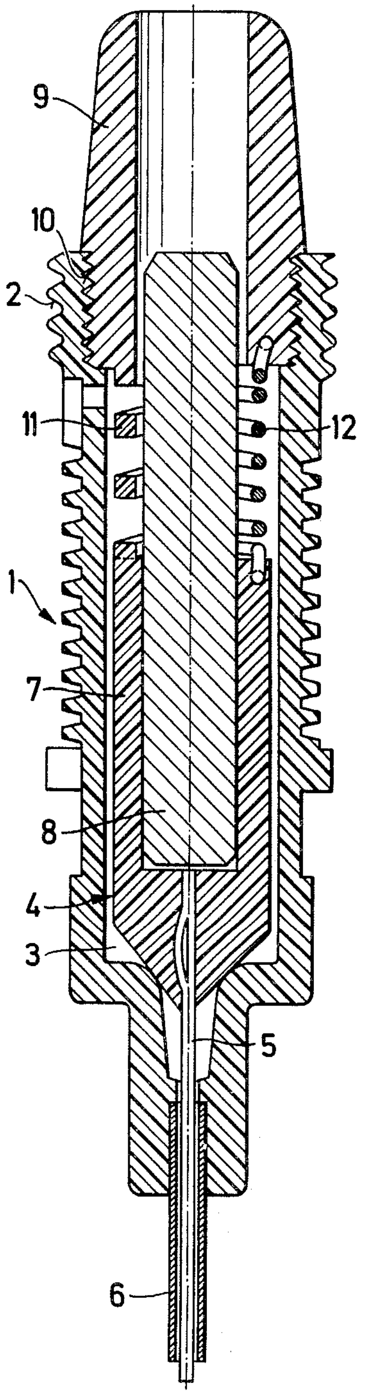
FIG. 1 is a longitudinal sectional view of the tubular pen according to the present invention with different spiral connecting elements being illustrated on both sides of the pen.

In FIG. 1 there is indicated generally at 1 a tubular pen according to the present invention which can be inserted into a holder of a manual writing implement or in a socket on drafting machines or recording devices by means of a coupling thread 2 on the end of the hollow body of the pen or by any other suitable fastening structure.

The tubular pen 1 has a hollow interior indicated at 3. Within the interior 3 there is positioned a freely axially displaceable weight 4 into one end of which is inserted a cleaning wire 5. The cleaning wire 5 extends into a writing tube 6 extending from the other or front end of the tubular pen 1. The wire 5 improves the flow of ink by increasing the capillarity within the writing tube 6 and also functions to clean the tube from carbon particles or from dry residues of india-ink.

The weight 4 comprises a casing 7 within which is secured a core element 8. The core 8 may be of metal, such as lead, or other suitable material including a synthetic resin.

On the other or rear end of the pen 1 there is attached an end cap 9 which functions as a retaining or protective element to prevent the weight 4 from accidentally or unintentionally sliding from out of the interior of the pen. The cap 9 can be threaded onto the end of the pen 1 by threads 10 or also fastened on the pen by locking knobs or other forms of detachable couplings so as to prevent accidental or unintentional removal of the cap.

On the left hand side of FIG. 1 the casing 7 is attached to the cap 9 by means of a synthetic resin spring 11 which is molded into or molded integrally with the cap and casing such that the casing, spring and cap consists of the same material and constitutes a single assembly. The spring 11 is thus formed directly onto the rear end of the casing 7 and also formed directly with the cap 9. Apart from the lead core 8, this assembly of casing, spring and cap avoids the use of other metal components which is particularly advantageous when relatively corrosive inks or india inks are used. In the case of such inks special treatment of the metal components would be required to protect against corrosion.

On the right hand side of FIG. 1 a metal spring 12 is firmly anchored or attached into the rear end of the casing 7 and in its other end to the cap 9. The spring 10 is in the form of a helical coil which surrounds the core 8 but is spaced at a predetermined distance therefrom to constitute a particularly advantageous embodiment of the present invention. The spring 12 can similarly be connected during the manufacturing process of the cap and casing by injection molding or other known molding processes.

Figure 2:
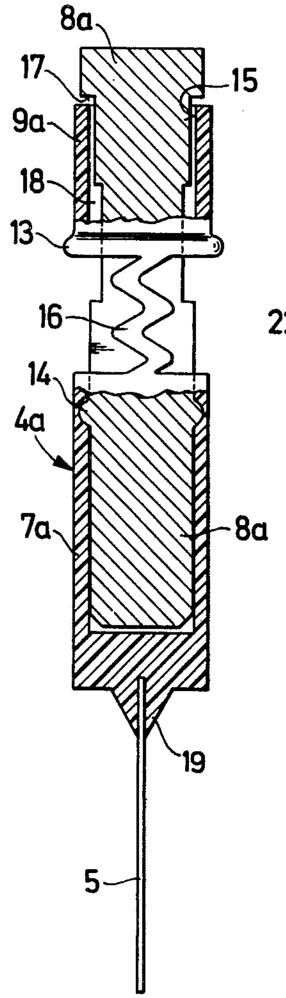
FIG. 2 is a longitudinal sectional view showing a freely displaceable weight according to the present invention including resilient connecting elements.

In FIG. 2, weight 4*a* comprises a core 8*a*, illustrated with its central portion removed, which is only partially enclosed by the casing 7*a*. On the other end of the core 8*a* there is formed a locking element 9*a* which comprises an insertion cap which can be attached to the tubular pen by means of the locking knobs 13. In a similar manner, the core 8*a* is provided with extensions 14 which lockingly engage the casing 7*a* to provide a fixed connection between the core and casing. This locking of the core and casing is desireable in this modification since the end cap 9*a* is generally formed with an opening 15 when single piece injection molding is used to form these components. The opening 15 in the cap 9*a* facilitates the removal of the molded component. The cleaning wire 5 is firmly inserted into an extension tip 19 formed on the lower end of the casing 7*a*.

The core 8*a* is connected to the end cap 9*a* by at least two synthetic resin helical coils 16. The coils 16 may be formed of synthetic resin and at least two substantially identical coils should be provided in order to facilitate the removal of the weight from the pen in the event that the needle should become attached in the tubular pen by dried ink. The coils 16 may be springs and are positioned to partially cover or embrace at least a portion of said core. The synthetic resin coils 16 extend between the end of the casing 7*a* enclosing the core 8*a* and the end cap 9*a*.

As may be seen in FIG. 2, the core 8*a* may extend outwardly of the end cap 9*a* and for this purpose core 8*a* is provided with an annular shoulder 17 which makes it possible for the weight to move axially outwardly of the pen in the direction of the reservoir while, at the same time, the shoulder constitutes an axial stop when the end cap 9*a* is removed. The entire weight can thus be removed from the tubular pen by means of the annular stop 17. In order to prevent any obstruction to radial movement of the locking knobs 13 on the end cap, which might occur during insertion of the entire unit of FIG. 2 into the tubular pen, the core 8*a* may be provided with axially extending recesses 18 in its outer surface in this area.

The modification of FIG. 2 offers particular advantages when the weights and/or interiors are provided with different shapes, such as would be the case when various extensions or other components act upon the pen from different positions or recesses might be provided for any purpose in the connecting area between the weight and the end cap.

Figure 3:
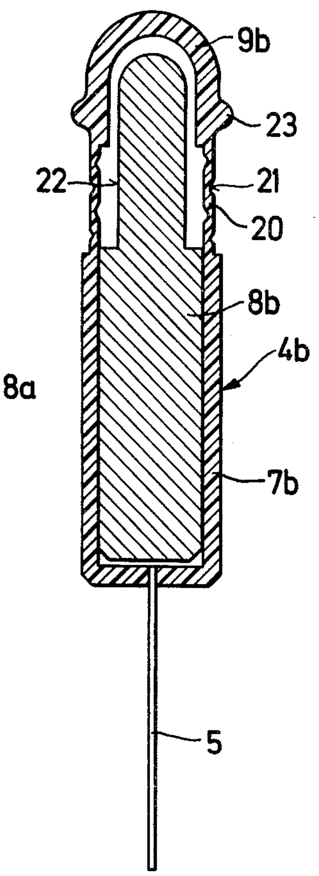
FIG. 3 is a further modification of the freely displaceable weight according to the present invention.

In the modification of FIG. 3, the freely displaceable weight 4*b* is connected to the cap 9*b* by two or more axially extending elongated elements 20. The inner and outer surfaces of each of the elements 20 may be provided with notches or recesses 21 disposed in staggered relationship on the surfaces so as to facilitate radial deviation of the elements 20 during movement of the weight in the direction of the end cap. Core 8*b* in FIG. 3 may also be provided with a smaller diameter portion 22 in the vicinity of the elements 20 in order to increase the distance through which these elongated elements may move radially.

The end cap 9*b* is in the form of a clamping ring having additional locking knobs 23 or may engage recesses in the tubular pen for responding to its maximum diameter. The core 8*b* may comprise the generally employed lead core or may be of some other material suitable as a loading mass.

In FIG. 3, the weight 4*b* may comprise a uniform, possibly a modified, form of a synthetic resin material or the like so that the two-part structure of the core and casing is avoided.

As described above, the connecting element between the weight and the end cap may comprise a metal spring the ends of which are firmly anchored in the respective elements. This combination of a metal spring and synthetic resin casing and cap is particularly advantageous where a spring-type connection effective in a minimum of space is required because only a very small space is available in the pen. However, it is to be noted that the invention is not limited to springs but includes other forms of connecting elements which provide for relative movement between the connected components so that the weight always is capable of free displacement within the tubular pen. The connections, other than springs, are particularly advantageous in that they facilitate assembly and disassembly of the pen since fewer manipulations are required. Because of the positive coupling between the weight and end cap, loosening of the cap already displaces the weight or removes the weight from the writing tip so that even a very short weight or a weight which is dried in the tip can be readily removed from the writing tip. The interconnection by spring or other elements between the weight and the end cap provides a single assembly or component which greatly facilitates assembly or disassembly of the tubular pen.

It will be understood that this invention is susceptible to modification in order to adapt it to different usages and conditions, and accordingly, it is desired to comprehend such modifications within this invention as may fall within the scope of the appended claims.

What is claimed is:

1. A tubular pen for recording apparatus and the like comprising a hollow body having an end cap, a freely displaceable weight within said body, said weight comprising a casing of synthetic resin material and a metallic core in said casing, and means firmly attached to each of said cap and weight for undetachably connecting said cap and weight such that there is a relative movement therebetween and the connected cap and weight define a single assembly.

2. A tubular pen as claimed in claim 1 wherein said connecting means comprises a spring of one of metal and synthetic resin material.

3. A tubular pen as claimed in claim 1 wherein said connecting means is integral with said cap and weight.

4. A tubular pen as claimed in claim 1 wherein said casing has a rear end, said connecting means comprises a synthetic resin element connected between said casing rear end and said cap.

5. A tubular pen as claimed in claim 4 wherein said synthetic resin connecting element is a helical coil spring surrounding said core but spaced therefrom.

6. A tubular pen as claimed in claim 1 wherein said casing has a rear end, said connecting means comprising at least two helical coils of synthetic resin material each partially extending over at least a portion of said core.

7. A tubular pen as claimed in claim 1 wherein said connecting means comprises a metal spring firmly anchored in each of said weight and cap.

8. A tubular pen as claimed in claim 1 wherein said connecting means comprises a pair of axially extending flexible elongated elements.

9. A tubular pen as claimed in claim 8 wherein said elongated elements each has notches on a surface thereof to facilitate radial movements of said elements during relative movement between said weight and cap.

* * * * *